(12) United States Patent
Sato et al.

(10) Patent No.: US 12,129,090 B2
(45) Date of Patent: Oct. 29, 2024

(54) PACKAGE AND CONTAINER

(71) Applicant: CANON KABUSHIKI KAISHA, Tokyo (JP)

(72) Inventors: Motoaki Sato, Tokyo (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/045,397

(22) Filed: Oct. 10, 2022

(65) Prior Publication Data

US 2023/0120121 A1 Apr. 20, 2023

(30) Foreign Application Priority Data

Oct. 13, 2021 (JP) .................. 2021-168117

(51) Int. Cl.
*B65D 65/46* (2006.01)
*C08L 101/16* (2006.01)

(52) U.S. Cl.
CPC .......... *B65D 65/466* (2013.01); *C08L 101/16* (2013.01); *C08L 2201/06* (2013.01)

(58) Field of Classification Search
CPC ...... B65D 65/46; B65D 65/466; B32B 27/18; B32B 27/36; B32B 2264/50; B32B 2264/502; B32B 2264/503; B32B 2307/716; B32B 2307/7163; B32B 2305/54; C08L 2201/106; C08L 101/16; C12N 11/087; Y02W 90/10; C08K 9/10; C08K 2201/18
USPC ........................... 428/35.7–36.92, 34.1–36.92
See application file for complete search history.

(56) References Cited

U.S. PATENT DOCUMENTS

| | | | | |
|---|---|---|---|---|
| 4,766,037 A * | 8/1988 | Watanabe | ............ | A61K 9/5031 428/321.5 |
| 4,963,458 A * | 10/1990 | Ishikawa | ................ | B41M 5/287 430/254 |
| 5,108,807 A * | 4/1992 | Tucker | .................. | B32B 27/306 523/124 |
| 5,381,172 A * | 1/1995 | Ujita | ..................... | B41J 2/17513 347/86 |
| 5,713,991 A * | 2/1998 | Kimura | ..................... | B41J 2/175 106/31.86 |
| 6,241,348 B1 * | 6/2001 | Haigo | .................. | B41J 2/17513 347/86 |
| 7,416,291 B1 * | 8/2008 | Hattori | ................. | B41J 2/17553 347/7 |
| 2001/0027225 A1 * | 10/2001 | Downie | ............... | C08K 5/0033 523/124 |
| 2003/0170411 A1 * | 9/2003 | Eida | ..................... | B65D 81/268 428/35.7 |

(Continued)

FOREIGN PATENT DOCUMENTS

| | | | | |
|---|---|---|---|---|
| EP | 0696299 B1 * | 8/1997 | ............. | B65D 65/42 |
| EP | 1701894 B1 * | 3/2012 | ........... | B65D 81/052 |

(Continued)

*Primary Examiner* — Michael C Romanowski
(74) *Attorney, Agent, or Firm* — Canon U.S.A., Inc. IP Division (57) ABSTRACT

A package or container contains a biodegradable resin and a microcapsule including therein a decomposition accelerator for the biodegradable resin. The microcapsule includes an outer shell containing a resin composition having photodegradability.

6 Claims, 4 Drawing Sheets

(56) References Cited

U.S. PATENT DOCUMENTS

| | | | | |
|---|---|---|---|---|
| 2005/0006271 A1* | 1/2005 | Nakagawa | B65D 81/052 | 206/521 |
| 2005/0175748 A1* | 8/2005 | Thijssen | A01N 63/50 | 426/326 |
| 2006/0265952 A1* | 11/2006 | Christal | A01C 1/04 | 47/65.7 |
| 2011/0200771 A1* | 8/2011 | Barclay | C08K 5/098 | 523/124 |
| 2012/0181247 A1* | 7/2012 | Grulke | B65D 23/12 | 215/386 |
| 2014/0241754 A1* | 8/2014 | Hymas | B65D 5/4212 | 206/509 |
| 2015/0259518 A1* | 9/2015 | Gelissen | C08L 23/06 | 252/582 |
| 2015/0275153 A1* | 10/2015 | Murphy | B65D 65/46 | 206/524.7 |
| 2016/0145413 A1* | 5/2016 | Patel | C08L 23/06 | 264/328.17 |
| 2016/0333147 A1* | 11/2016 | Ferreira | C12N 11/18 | |
| 2017/0259976 A1* | 9/2017 | Lee | A45F 5/00 | |
| 2018/0354694 A1* | 12/2018 | Goto | B65D 75/004 | |
| 2019/0031873 A1* | 1/2019 | Kuhl | C08L 23/14 | |
| 2020/0199354 A1* | 6/2020 | Dalibey | C08J 3/22 | |
| 2020/0317419 A1* | 10/2020 | Johnson | B65D 85/187 | |
| 2022/0267068 A1* | 8/2022 | Arnault | B32B 27/08 | |
| 2023/0045878 A1* | 2/2023 | Xie | B32B 27/08 | |

FOREIGN PATENT DOCUMENTS

| | | | | |
|---|---|---|---|---|
| JP | H06198909 A | * | 7/1994 | B41J 2/175 |
| JP | 2002356623 A | * | 12/2002 | C08J 11/105 |
| JP | 2009248452 A | * | 10/2009 | B65D 65/40 |

* cited by examiner

PACKAGE AND CONTAINER

BACKGROUND

Field of the Disclosure

The present disclosure relates to a package or a container using a biodegradable resin and containing a microcapsule encapsulating a microorganism or enzyme that can decompose the biodegradable resin.

Description of the Related Art

Plastic products, which are widely used throughout the industry, are not easily decomposed in the natural environment and remain in the soil and ocean for a long time. Accordingly, in order to reduce the load on the natural environment, various types of biodegradable plastic that can be decomposed by microorganisms are used. The number of products using biodegradable plastic is gradually increasing. However, there are almost no examples of performing a treatment method that takes advantage of the decomposition conditions for individual biodegradable plastic (for example, in the case of biodegradable plastic using polylactic acid, biodegradation is performed in compost) at the time of disposal. Accordingly, biodegradable plastic is also usually incinerated as in general synthetic resins. Thus, if the material flow remains the same, it is hard to say that the biodegradability itself provides environmental consideration to products. In addition, biodegradable plastic durable goods are collected by recycling routes, but nondurable goods, such as a package and a protective material package film, are discarded as general garbage when they finish their functions. In order to decompose biodegradable plastic to water and carbon dioxide, the presence of a microorganism that secrets an enzyme capable of decomposing the biodegradable plastic is essential, and complete decomposition takes a long time after being buried in the soil. Accordingly, in the case of being buried as general garbage, the biodegradable plastic remains in the soil while keeping the form for a long period until being decomposed and becomes a factor of the load on the environment. Accordingly, in order to rapidly decompose a biodegradable resin after disposal, a technique of adding a microcapsule encapsulating a microorganism or enzyme that can decompose a biodegradable resin to the biodegradable resin is known (Japanese Patent Laid-Open No. 2002-356623). In the biodegradable resin according to Japanese Patent Laid-Open No. 2002-356623, the decomposition of the biodegradable resin starts after disposal and pulverization of the resin itself. Therefore, if the resin is not certainly pulverized in collection and reclamation thereof, the decomposition of the resin is unlikely to be started, and the decomposition takes time.

SUMMARY

Taking a package of an electronic device as an example, it is desirable that the package plays a role of blocking a product from the external environment and protecting the product until immediately before using it and that the decomposition of the package (biodegradable resin) promptly progresses after taking out the product.

The present disclosure provides a package or container in which a decomposition accelerator contained in a biodegradable resin constituting the package or container affects the biodegradable resin by physical stimuli in the stage of opening the package or container to start the decomposition of the biodegradable resin.

The present inventors have made various studies to solve the above problems and, as a result, encapsulated a microorganism, enzyme, or the like as a decomposition accelerator having an action of accelerating the decomposition of a biodegradable resin in a microcapsule that is decomposable by light irradiation and includes an outer shell having photodegradability. The present inventors found that the above problems can be solved by producing a package or container using a biodegradable resin composition including the microcapsule and the biodegradable resin and accomplished the present disclosure.

An aspect of the present disclosure is a package or container containing a biodegradable resin and a microcapsule including therein a decomposition accelerator for the biodegradable resin, wherein the microcapsule includes an outer shell containing a resin composition having photodegradability.

Further features of various embodiments will become apparent from the following description of exemplary embodiments with reference to the attached drawings.

DESCRIPTION OF THE EMBODIMENTS

The package or container according to the present disclosure contains a biodegradable resin and a microcapsule including therein a decomposition accelerator for the biodegradable resin. Specifically, the package or container according to the present disclosure is composed of a biodegradable resin composition including a biodegradable resin and a microcapsule including therein a decomposition accelerator for the biodegradable resin. The microcapsule is characterized by including an outer shell containing a resin composition having photodegradability. Embodiments of the present disclosure will now be described in detail.

Biodegradable Resin

The biodegradable resin (biodegradable plastic) is not particularly limited, and examples thereof include general biodegradable resins, such as PLA (polylactic acid), PHA (polyhydroxy alkanoic acid), PHB (poly(3-hydroxybutyrate)), PBS (polybutylene succinate), PPL (poly(β-propiolactone)), PCL (poly(ε-caprolactone)), and PEA (polyethylene adipate). Among these resins, those adapted for the characteristics required for a package or container can be used alone or can be used as a polymer blend or by graft polymerization of two or more thereof. Alternatively, the above-mentioned biodegradable resins may be chemically modified with other synthetic polymers having biodegradability and used.

Microcapsule

The microcapsule is composed of an inclusion called "core material" and a capsule called "outer shell" including therein the core material. In the microcapsule according to the present disclosure, the core material is a decomposition accelerator that promotes the decomposition of a biodegradable resin, and the outer shell contains a resin composition having photodegradability. In the present disclosure, the size of the microcapsule can be 1 to 50 μm.

Decomposition Accelerator

As the decomposition accelerator promoting the decomposition of a biodegradable resin, microorganisms that can decompose respective biodegradable resins, enzymes secreted by the microorganisms, and chemical materials equivalent thereto are used. For example, known are actinomycete of the genus Amycolatopsis for decomposition of PBS and PLA, PHB depolymerase and lipase for PPL, strains of the genus *Penicillium* for PEA and PCL, and strains of the genera *Bacillus, Pseudomonas*, and *Streptomyces* for PHB (poly(3-hydroxybutyrate).

The decomposition speed can be further increased by using, in addition to the above microorganism or enzyme, an oxidation type accelerator that reduces the molecular weight of a biodegradable resin as a decomposition accelerator. Examples of the oxidation type accelerator include known metal oxides and oxidizers. Incidentally, the microorganism or enzyme and the oxidation type accelerator may be encapsulated in respective different microcapsules. Alternatively, the microcapsule may have a multilayer structure in which the oxidation type accelerator is disposed in an outer layer and the microorganism or enzyme decomposing the biodegradable resin is disposed in an inner layer thereof.

From the viewpoint of the molding processing and material mechanical properties of a resin, the additive amount of the decomposition accelerator is preferably 1 to 20 mass % with respect to the total amount of the biodegradable resin. When the additive amount of the decomposition accelerator is within the above range, there is no risk of affecting the strength physical properties, resistance to environment, distribution preservability, and so on. The microcapsule is added to the biodegradable resin such that the additive amount of the decomposition accelerator with respect to the biodegradable resin is within the above range.

Resin Composition Having Photodegradability

The outer shell of the microcapsule according to the present disclosure contains a resin composition having photodegradability (photodegradation property). That is, the microcapsule according to the present disclosure is a microcapsule having photodegradability.

The energy of sunlight is smaller than the energy of a C—C bond, which is the main-chain bond of a polymer chain. Accordingly, the photodegradation of plastic is manifested by photochemically generating a radical in the polymer chain to advance an oxidation reaction. That is, the photodegradation proceeds in such a manner that a photosensitizer is irradiated with light in a wavelength region sensitive to the photosensitizer to excite to an excited triplet and the excited triplet extracts hydrogen atoms (oxidation) from the polymer. Alternatively, the photodegradation proceeds in such a manner that energy moves from the photosensitizer to an oxygen molecule to generate singlet oxygen and the singlet oxygen reacts with the polymer.

As a general photodegradation reaction, a Norrish reaction, which is a photodegradation reaction of a carbonyl compound (ketone or aldehyde), is known. In a Norrish type I reaction (Type I), a carbonyl compound is excited by light irradiation to cleave the bond at the α-position of a carbonyl group, and two radicals are thereby generated via a radical pair to proceed the reaction by a radical mechanism (the formula (1) below). In contrast, in a Norrish type II reaction (Type II), a hydrogen atom bonded to carbon at the γ-position is extracted by the excited carbonyl oxygen to give a biradical. The generated biradical cleaves the carbon-carbon bonds at the xx-position and the β-position to cause decomposition into ketone and olefine (the formula (2) below) or to give a cyclobutanol derivative by recombination in the molecule. Incidentally, in a case of a polymer not having a carbonyl group in the molecule, photodegradation is performed by introduction of a carbonyl group via oxidation.

[Chem. 1]

(1)

(2)

The resin composition having photodegradability preferably contains a resin having a carbonyl group or one or more optical excitation structures selected from unsaturated bonds, such as a carbon-carbon double bond. Examples of such resins include ethylene-based unsaturated carboxylic acids, such as (meth)acrylic acid and (meth)acrylic acid ester, and polymers or copolymers containing the ester as a monomer. Incidentally, in the present disclosure, the term "(meth)acrylic acid" means acrylic acid or methacrylic acid, and the term "(meth)acrylic acid ester" means acrylic acid ester or methacrylic acid ester.

The resin composition having photodegradability is obtained by mixing a photodegradation agent having an absorption wavelength in the ultraviolet to visible light region with a resin that is usually used for constituting a capsule outer shell, such as an acrylic polymer and a polyvinyl alcohol. Examples of the photodegradation agent include photosensitizers that perform a reaction of extracting hydrogen from a polymer by optical excitation, for example, aromatic ketones (such as benzophenone) and quinones (such as anthraquinone); dithiocarbamates, which are easily decomposed by light, such as iron dithiocarbamate and copper dithiocarbamate; and compounds having unsaturated bonds, such as a carbon-carbon double bond and a carbon-carbon triple bond, generating aromatic ketones by irradiation of aromatic diene, aromatic triene, or the like with light. Among these agents, it is preferable, in some embodiments, to use a photosensitizer as the photodegradation agent.

The resin composition having photodegradability is obtained by introducing a photodegradable functional group, such as an azo group, a carbonyl group, and an ether group, into a resin that is usually used for constituting a capsule outer shell. The capsule outer shell may be constituted using a polymer alloy having such a functional group. For example, a resin composition having photodegradability can be constituted as a polymer containing a photodegradable functional group in the structure alone or as a copolymer by adding an azobenzene compound to an acrylic polymer. Alternatively, when a resin itself having a carbonyl group or one or more optical excitation structures selected from unsaturated bonds, such as a carbon-carbon double bond, and having photodegradability is used, the resin having photodegradability may be used as the resin composition having photodegradability. In order to further increase the sensitivity, a photosensitizer having sensitivity in the ultraviolet to visible light region may be added to a resin having photodegradability.

Incidentally, the decomposition of the resin constituting the outer shell of the microcapsule by light requires the presence of oxygen. Accordingly, when the produced package or container is used for accommodating a product, oxygen is preferably removed by making the inside of the package or container a nitrogen atmosphere or by deaeration.

Since the package or container according to the present disclosure is in a state in which the inside is shielded from light while a product is enclosed in the package or container, the decomposition accelerator included in the microcapsule does not affect. Then, light enters the inside at the time of opening the package or container to promptly start the decomposition of the biodegradable resin. Specifically, when the package or container according to the present disclosure is opened at the time of removing the product in the package or container, natural light enters the cross section of the part torn by opening and enters the exposed surface of the inside (the side in contact with the product, hereinafter, also referred to as "product side") of the package or container. The photodegradable resin composition contained in the outer shell is decomposed by the light that entered the outer shell of the microcapsule disposed in the biodegradable resin, and the decomposition accelerator in the microcapsule is gradually released from a gap generated in the outer shell to start decomposition of the biodegradable resin.

The package or container according to the present disclosure is manufactured by, for example, as follows. First, a photodegradation agent is added to a resin constituting a microcapsule outer shell to provide a resin composition having photodegradability. Subsequently, a microcapsule encapsulating a decomposition accelerator is prepared using the resin composition by a known method. Then, the resulting microcapsule is added to a biodegradable resin to obtain a biodegradable resin composition. A package or container according to the present disclosure can be obtained by processing a film from the biodegradable resin composition and forming the resulting film into a bag. Incidentally, the shape and size of the package or container may be appropriately selected in accordance with the product to be used.

The microcapsule including therein the decomposition accelerator may be uniformly dispersed in the biodegradable resin but, in some embodiments, preferably has bias in the concentration of the microcapsule in the package or container.

For example, a large amount of the microcapsule may be disposed in the inside (product side) of the package or container such that the concentration of the microcapsule in the inside of the package or container is higher than the concentration of the microcapsule in the outside (surface side). A concentration distribution of the microcapsule may be formed in the plane of the inside surface of the package or container or in the depth direction from the outside (surface) of the package or container or in the plane.

Incidentally, examples of the method for giving bias in the concentration of the microcapsule in the package or container, that is, a method for providing a region with a high concentration of the microcapsule, include the following method. That is, it is a method for giving a concentration distribution using the amount of the microcapsule added to the biodegradable resin as a control. Specifically, the method can be performed by a solution application method by after-adding the microcapsule, a spray application method, or the like. Examples of the method for giving bias in the concentration in a plane of the package or container include a method of applying or spray applying a microcapsule or a microcapsule-containing resin solution to a biodegradable resin in a region of encapsulating the microcapsule or a region corresponding to the region with a high concentration of the microcapsule.

Figure 3:
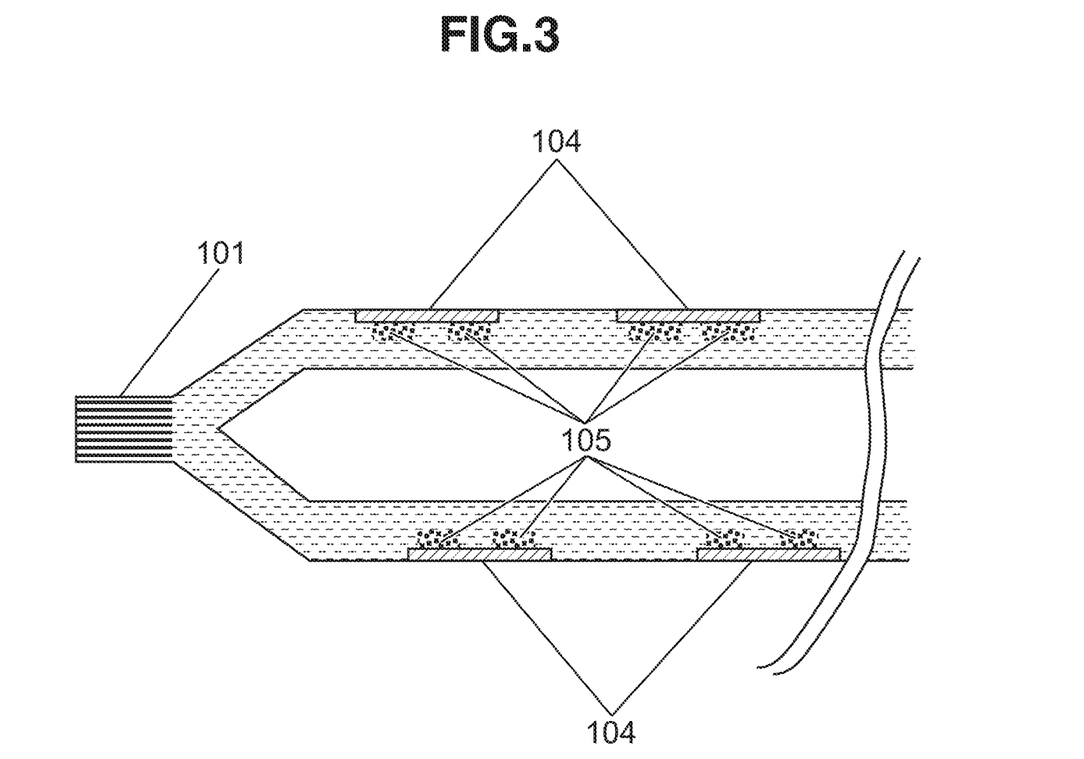
FIG. 3 is a schematic cross-sectional view taken along the line III-III of the gusset bag shown in FIG. 2.

The environment of exposure to light varies depending on the place where the package or container is opened when the user uses it. When the biodegradable resin has a high transparency or a low gas barrier property to oxygen, it may be necessary to adjust the decomposition promoting effect. Examples of the method for adjusting the decomposition promoting effect of the biodegradable resin within the guarantee period of a product include a method for adjusting the amount of incident light by appropriately disposing a printing area having a printing layer stating the opening method, product name, logo, precautions, etc. on the package or container. For example, as shown in FIG. 3, a printing layer 104 is provided on the outside (surface) of a package as a surface layer, and a microcapsule-encapsulating region 105 is provided on the underside (the side close to the product side) of the printing layer. According to this configuration, the amount of incident light on the microcapsule can be adjusted by decreasing or blocking the light from the surface by the printing layer. On this occasion, more microcapsule-encapsulating regions may be disposed in a part closer to the inside (product side) of the package. Here, although the microcapsule-encapsulating region means that the microcapsule is encapsulated only in the region, a region having a high concentration of the microcapsule may be disposed on the underside of the printing layer instead of the microcapsule-encapsulating region. Incidentally, the microcapsule-encapsulating region can be formed by, for example, applying or spray applying a microcapsule or a microcapsule-containing resin solution to a region corresponding to the microcapsule-encapsulating region of the biodegradable resin.

The color material that is used in the printing layer may be either pigment-based or dye-based, and the type thereof does not matter, as long as it is a color material that is used in general packages or containers. However, it is preferable to form a printing layer by printing using a known biodegradable ink. The printing area acquires a light-shielding effect by printing words, such as a logo and the opening method, but in addition to the words, the entire layer may be colored using a color material capable of shielding light. When a printing layer is provided, the printing layer is not necessarily positioned on the outermost surface of the package or container, as long as the microcapsule-encapsulating region (or a region having a high concentration of the microcapsule) is positioned in the inside (product side) of the package or container than the printing layer.

Figure 4:
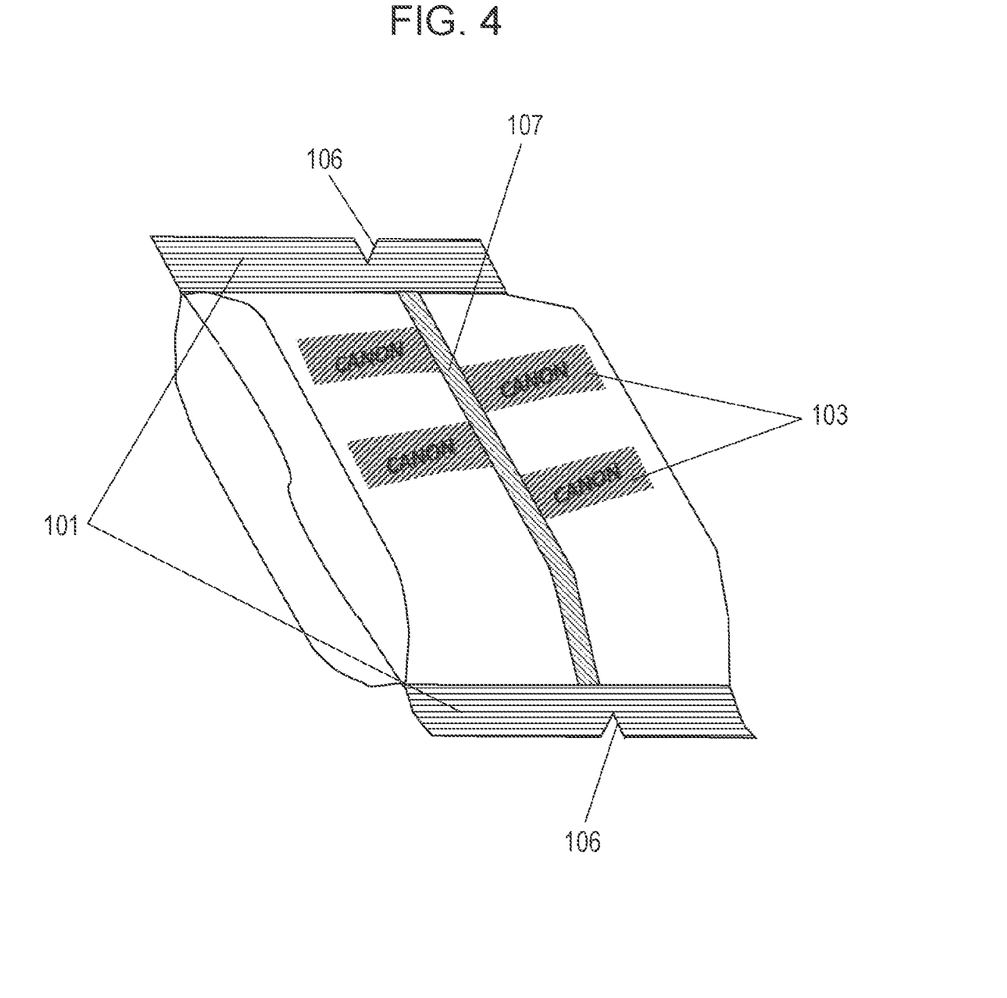
FIG. 4 is a schematic view of a gusset bag according to an aspect of the present disclosure.

At the same time, examples of the method for accelerating the decomposition promoting effect include a method of providing an easy-to-open part having an easy-to-open structure in the package or container. The surface of the inside (product side) of the package or container is easily exposed to light at the time of opening by providing the easy-to-open part. Furthermore, the microcapsule is certainly irradiated with light at the time of opening by providing a region having a high concentration of the microcapsule in the periphery of the easy-to-open part, and collapse of the microcapsule and decomposition of the biodegradable resin by release of the decomposition accelerator are further accelerated. Specifically mentioned is, as shown in FIG. 4, a method in which a plurality of V-notches 106 is disposed on the surface of a package as an easy-to-open structure, and a strip region 107 having a high concentration of the microcapsule is disposed on the extension of the notch or in a region connecting between notches. The strip region may be disposed on the underside (the side close to the product side) of the printing layer described above.

In addition, the strip region may be disposed to be in contact with the printing layer. Incidentally, the strip region can be easily formed by a method of applying or die coating a microcapsule or microcapsule-containing resin solution.

Alternatively, a strip region having a high concentration of the microcapsule may be provided on the extension of an easy-to-open structure, such as one or more notches, provided in a periphery (end or side portion) of a package or in a region that is certainly torn at the time of tearing the package. As the easy-to-open structure, the exposure region of the microcapsule at the time of opening a package may be increased by providing a laser cut or perforations only on the top surface on the surface side of the region having a high concentration of the microcapsule. Consequently, when a user opens the product, the inside of the package can be certainly exposed to light, and the microcapsule-encapsulating region in a cross section of the package is directly exposed, which allows decomposition of the microcapsule outer shell to be more certainly started. Incidentally, if the decomposition accelerator is a microorganism, after collapse of the microcapsule, the microorganism comes into contact with a nutritious biodegradable resin to proceed the decomposition in a chain reaction.

EXAMPLE EMBODIMENTS

Example embodiments will now be described.

Example 1

Figure 1:
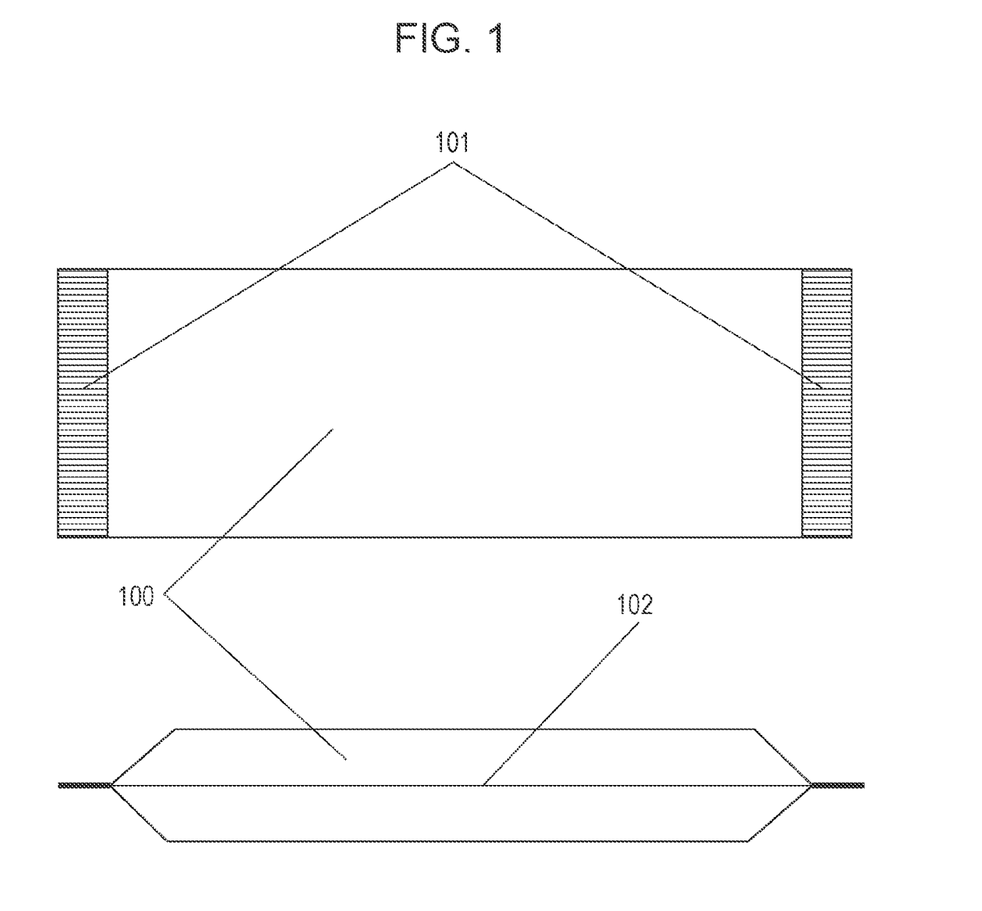
FIG. 1 shows plan and side views of a gusset bag according to an aspect of the present disclosure.

A microcapsule (size: 10 μm) made of a methyl polymethacrylate-styrene copolymer containing benzophenone (0.5 mass %) and encapsulating actinomycete of the genus Amycolatopsis as a decomposition accelerator was prepared. The resulting microcapsule was added to PLA (poly (L-lactide)) as a biodegradable resin in an amount of 3 mass % to obtain a biodegradable resin composition. A film was processed from the biodegradable resin composition. The resulting film was formed into a side gusset bag 100 as shown in FIG. 1 as a pillow bag for an interchangeable ink cartridge. Incidentally, as shown in FIG. 1, the gusset bag 100 includes a welding region 101 on each end and includes a gusset portion 102 on the side.

Example 2

Figure 2:
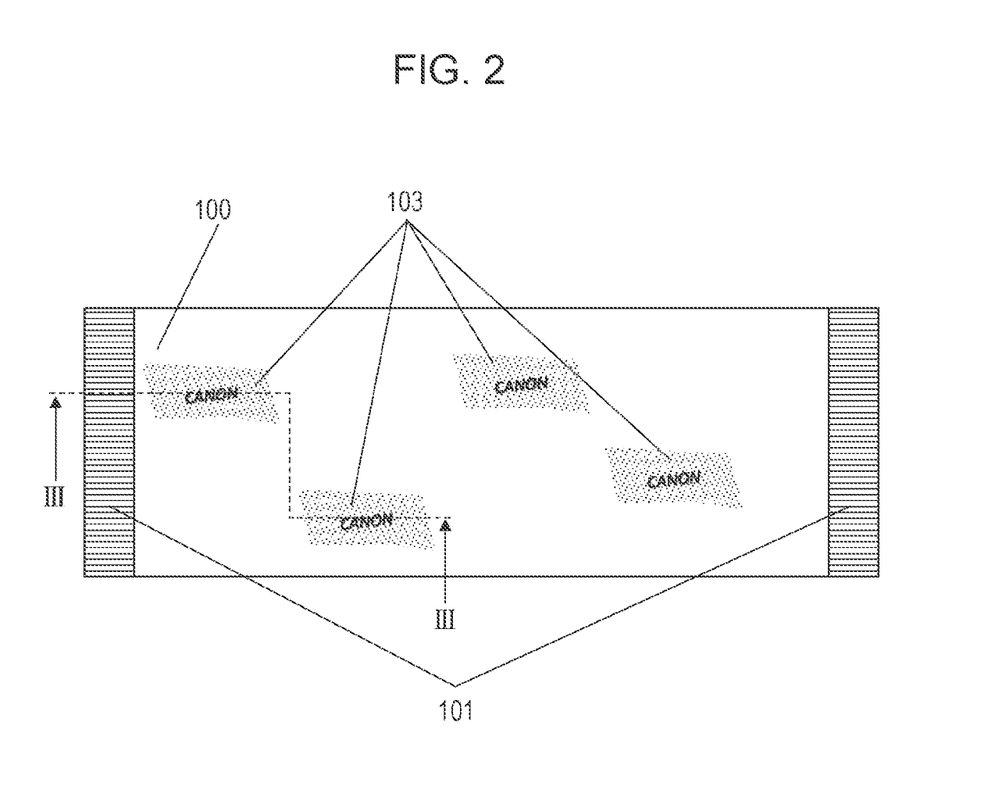
FIG. 2 is a schematic plan view of a gusset bag according to an aspect of the present disclosure.

A microcapsule (size: 15 μm) made of a polyvinyl alcohol-methyl methacrylate copolymer containing benzophenone (0.5 mass %) and encapsulating fungi of the genus *Penicillium* as a decomposition accelerator was prepared. The resulting microcapsule was added to PCL (poly(ε-caprolactone)) as a biodegradable resin in an amount of 3 mass %. A region having a high concentration of the microcapsule (addition of 4.5 mass % of the microcapsule to the biodegradable resin) was provided in advance at a portion becoming a printing area by adding the microcapsule or a microcapsule-containing resin solution by application or spray injection to obtain a biodegradable resin composition. A film was processed from the biodegradable resin composition. Incidentally, a plurality of biodegradable resin compositions having different microcapsule concentrations may be formed into a film at one time by an extrusion system with a plurality of die heads. In addition, the film was provided with printing areas 103 including a printing layer stating a description, a logo mark, etc. as shown in FIG. 2 by ink-jet printing. Furthermore, as shown in FIG. 3, regions 105 where the concentration of the microcapsule was high were provided on the underside (the side close to the product side) of the surface layer provided with printing layers 104 by a post addition method of the microcapsule. The microcapsule was added in an amount of 4.5 mass % as the total amount to the biodegradable resin composition. The resulting film was formed into a side gusset bag as shown in FIG. 1 as a pillow bag for an interchangeable ink cartridge.

Example 3

A microcapsule (size: 20 μm) made of an ethylene-methacrylic acid copolymer containing benzophenone (0.5 mass %) and encapsulating actinomycete of the genus Amycolatopsis as a decomposition accelerator was prepared. The microcapsule (5.0 mass %) was added to a region 105 becoming the underside of a printing layer 104 by the same method as in Example 2 using the resulting microcapsule and PBS (polybutylene succinate) as a biodegradable resin. In addition, in the region other than the above, the microcapsule was added to the biodegradable resin in an amount of 4.0 mass %. Furthermore, as shown in FIG. 4, a film was produced and a strip region 107 having a high concentration of the microcapsule was also formed in the region on the line connecting V-notches 106 to be provided after formation of a bag to form a film. Incidentally, the strip region was also provided by application or spray application of the microcapsule or a microcapsule-containing resin solution. The strip region is present in a region close to the product side under the printing area and is a region having a high concentration of the microcapsule. The resulting film was formed into a side gusset bag as shown in FIG. 4 as a pillow bag for an interchangeable ink cartridge. Furthermore, as shown in FIG. 4, a V-notch 106 was provided to each of the welding regions 101.

It was confirmed that the gusset bags obtained in Examples 1 to 3 started decomposition of the package after opening.

According to the present disclosure, a package or container, in which a decomposition accelerator included in a biodegradable resin constituting the package or container affects the biodegradable resin by physical stimuli in the stage of opening the package or container to start the decomposition of the biodegradable resin, can be obtained.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-168117, which was filed on Oct. 13, 2021 and which is hereby incorporated by reference herein in its entirety.

What is claimed is:
1. A package or container for an interchangeable ink cartridge, comprising:
 a biodegradable resin layer containing
  a biodegradable resin and a microcapsule including a core material and an outer shell including therein the core material, and a printing layer provided on an outside of a part of the biodegradable resin layer;

wherein the core material comprises a decomposition accelerator for the biodegradable resin, and the outer shell comprises a resin composition having photodegradability, wherein the package or container comprises
- an easy-to-open part including the biodegradable resin layer provided at one end, in a periphery of the package or container, and
- an extension of the easy-to-open part, including the biodegradable resin layer and extending from the one end to another end of the package or container, wherein, in a plane, a concentration of the microcapsule in a region of the biodegradable resin layer with the printing layer outside of the biodegradable resin layer is higher than a concentration of the microcapsule in a region of the biodegradable resin layer without the printing layer outside of the biodegradable resin layer, and wherein a concentration of the microcapsule in a region of the extension of the easy-to-open part is higher than a concentration of the microcapsule in the easy-to-open part.

2. The package or container for the interchangeable ink cartridge according to claim 1, wherein
the decomposition accelerator for the biodegradable resin is a microorganism or enzyme secreted by the microorganism that can decompose the biodegradable resin.

3. The package or container for the interchangeable ink cartridge according to claim 1, wherein
the resin composition having photodegradability contains a resin having a carbonyl group or an optical excitation structure having at least one carbon-carbon double bond.

4. The package or container for the interchangeable ink cartridge according to claim 1, wherein
the resin composition having photodegradability contains a photodegradation agent or a resin including a photodegradable functional group.

5. The package or container for the interchangeable ink cartridge according to claim 1,
wherein a concentration of the microcapsule in an outer part of the biodegradable resin layer is higher than a concentration of the microcapsule in an inner part of the biodegradable resin layer.

6. The package or container for the interchangeable ink cartridge according to claim 1, wherein the printing layer and the region of the extension of the easy-to-open part are adjacent to each other.

* * * * *